3,132,051
CONTINUOUS PROCESS FOR EXTRACTING PENTOSES FROM SUBSTANCES CONTAINING HEMICELLULOSES

Luciano Nobile, Renato Allegrini, and Anteo Poma, all of Milan, Italy, assignors to Ledoga S.p.A., Milan, Italy
No Drawing. Filed May 31, 1961, Ser. No. 113,675
Claims priority, application Italy June 9, 1960
7 Claims. (Cl. 127—36)

The trend in modern chemistry is not only to discover new products but to find new applications for existing products; there is therefore a need for existing products to be available with increased purity and at reduced cost if their use is to become more widespread. For instance, xylose, a product which has been known for a long time, started to be widely used only fairly recently either directly or as a starting material for the preparation of derivatives, mainly xylitol, which is prepared by catalytic reduction and which seems likely to be used widely in the preparation of foodstuffs and of industrial products. It is known to prepare xylose by hydrolysis of the xylans which form the main part of the pentosans derived from the hemicelluloses; the latter are contained in varying proportions in vegetable substances, more particularly in annual and broad-leaved plants.

It is known that acid solutions hydrolyse the hemicelluloses and the same yield their pentosan contents as free pentoses. Also, hydrolytic treatment with acid solutions of plants containing hexosans yields pentoses, the purity of which depends upon the extent to which the hydrolysing agent breaks up the cellulose. Clearly, therefore, to provide very pure pentose solutions, treatment conditions must be devised which lead to products of very high purity but do not reduce the pentose yield. The processes using acid solutions to hydrolyse hexosans have been known for a long time but lead to solutions which are either very impure or not pure enough for xylose to be yielded readily in the crystalline state. Also, the known processes combine the preparation of xylose with the preparation of dextrose, and dextrose requires more thorough hydrolysis with repeated crystallisation and purification steps.

However, there is no known process for extracting pentoses by continuous processes which would, of course, have considerable economic advantages.

This invention relates to a process for preparing pentose solutions of elevated purity, from which solutions crystalline and very pure xylose can readily be prepared. For best results the starting materials used in the process according to the invention are very wet vegetable susbtances such as result, for instance, from the extraction of tannic acid or of cane sugar, but starting materials having reduced moisture contents can also be used advantageously. The vegetable substance used as starting material must have moisture contents of about 45% or less. If the aqueous contents are greater than about 45%, the required level is achieved by the substance being pressed in conventional apparatus.

In the process according to the invention, the vegetable substance containing the pentose is placed in contact with a solution of sulphur dioxide in water or in sugar recovery solution, in a quantity such that the sulphur dioxide solution is completely absorbed by the vegetable substance. The resultant substance is then heat treated at a temperature of from 60 to 130° C. for from 1 to 6 hours in a closed vessel suitable for continuous working, then removed therefrom and given pressure treatment in conventional apparatus until the moisture contents are the same as they were before the treatment with sulphur dioxide solution.

In a preferred form of the invention working comprises the following steps:

(1) The aqueous contents of the vegetable substances used as starting material are brought, if necessary, to a level of 45% or less by such substances being passed continuously through a pressing apparatus;

(2) The substance when in this state of maximum moisture contents is brought into contact with a solution of sulphur dioxide in water or in sugar recovery solution, of a varying concentration and in a quantity such as to be completely absorbed by the substance being treated—i.e., with the exclusion of a liquid phase. The quantity of solution of $SO_2$ in water or in dilute sugar solution which should be used is calculated in accordance with the moisture contents of the treatment substance after pressure treatment. Once the quantity of impregnating solution has been calculated, the sulphur dioxide concentration of such solution is arranged so that the quantity of sulphur dioxide is from 1 to 10% of anhydrous vegetable substance.

(3) The treatment material is introduced continuously by appropriate means into an acid-proof pressure-tight vessel from which the material can be discharged continuously by appropriate means.

(4) The charging rate of the material is so controlled that the impregnated material stays in the closed vessel at a temperature of from 60 to 130° C. for a time of from 1 to 6 hours.

(5) The material which leaves the pressure vessel passes continuously through a pressing apparatus for reduction of moisture contents to the original level, a concentrated solution of xylose therefore being provided containing merely traces of sulphur dioxide; the xylose solution can then be given concentration and purification treatment in known manner.

(6) The solid material which has been given pressure treatment and which still contains considerable quantities of xylose is given a first continuous wash in appropriate apparatus with dilute sugar solutions supplied by a vessel for collecting the liquids yielded in the second wash described hereinafter in section (7), liquids therefore being yielded which, after an addition of sulphur dioxide, can be re-used to impregnate wood which has been given pressure treatment.

(7) A second continuous wash is given in an appropriate apparatus and liquids are yielded which can be used for the first wash hereinbefore described in section (6). The residual cellolignin can be used either for dextrose saccharification or for cellulose manufacture or as a fuel or in other ways.

Example 1

Four hundred and twenty-five kg. of chestnut wood from which the tannic acid has been removed and which has, after pressure treatment, moisture contents of 42%—i.e., which corresponds to 250 kg. of anhydrous wood—and which contains 18.64% of pentoses referred to the anhydrous state—i.e., 46.6 kg. of pentoses—are impregnated with 319 litres of an aqueous solution containing 15 kg. of sulphur dioxide. The solid and moist substance thus prepared passes continuously through a closed vessel, staying therein for 60 minutes at 120° C. The substance then passes through a conical press from which 210 litres of solution containing 13.7 kg. of pentoses are recovered. The solid residue is washed with water and pressed again, a washing liquid which contains 9.6 kg. of pentoses being yielded. A total of 23.3 kg. of pentoses is therefore yielded, equivalent to 50% of the contents of the starting material. The total sugars present are 28.77 kg., so that the purity ratio of pentoses to total sugars is 81.3%.

Example 2

An amount of 446 kg. of bagasse having 44% moisture contents and 21.38% of pentoses is treated with 304 litres of a solution containing 15 kg. of sulphur dioxide. The substance is kept in the digester at a temperature of 130° C. for 60 minutes. After pressure treatment and washing, 39.87 kg. of pentoses are yielded, equivalent to 74.5% of the pentoses containing the starting material, with a purity ratio of pentoses to total sugars of 91.4%.

*Example 3*

An amount of 416 kg. of fir chips having 40% moisture contents and 5.48% pentose contents are impregnated with 334 litres of solution containing 15 kg. of sulphur dioxide. The impregnated chips pass through a continuous vertical digester at a temperature of 125° C. for 120 minutes. After pressure treatment and washing, 10.73 kg. of pentoses are yielded, equivalent to a yield of 78.32% calculated on the basis of pentoses contained in the wood before treatment. The sugars yielded are 22.80 kg., giving a ratio of pentoses to total sugars of 92%. The residual cellolignin yielded in this example can be purified by known processes and is then very suitable for working up into rayon.

*Example 4*

An amount of 416 kg. of beechwood chips having 40% moisture contents and 24.72% pentose contents are treated with 166 litres of solution containing 15 kg. of sulphur dioxide. The substance is kept in the digester at a temperature of 125° C. for 60 minutes. After pressure and washing treatment, 39.67 kg. of pentoses are yielded, equivalent to 64.8% of the pentoses initially contained in the wood.

*Example 5*

An amount of 416 kg. of beechwood chips are treated with 334 litres of solution containing 25 kg. of sulphur dioxide and are kept in the digester at a temperature of 125° C. for 60 minutes. After pressure and washing treatment, 52.53 kg. of pentoses are yielded, equivalent to 85% of the pentoses initially present in the wood. The total sugars are 59.48 kg., giving a ratio of pentoses to total sugars of 88.30%.

*Example 6*

An amount of 334 litres of solution containing 5 kg. of sulphur dioxide are treated with 416 kg. of beechwood chips which are kept in the digester at 120° C. for 180 minutes. After pressure and washing treatment, 42.47 kg. are yielded, equivalent to 68.72% of the pentoses initially present in the wood.

We claim:

1. Process for the preparation of concentrated solutions of xylose of elevated purity, wherein vegetable substance containing hemicelluloses is treated with a solution of sulphur dioxide in a quantity not greater than can be completely absorbed by the vegetable substance, in a closed vessel, at from 60 to 130° C. for from 1 to 6 hours, whereby the digestion occurs in the substantial absence of a liquid phase.

2. Process as set forth in claim 1 wherein the treatment of the vegetable substance together with the sulphur dioxide solution are continuously charged into a vessel in which the digestion takes place.

3. Process as set forth in claim 1 wherein the starting material is chestnut wood from which the tannic acid has been removed.

4. Process as set forth in claim 1 wherein the starting material is sugar cane bagasse.

5. Process as set forth in claim 1 wherein the starting material takes the form of fir chips.

6. Process as set forth in claim 1 wherein the starting material takes the form of beechwood chips.

7. Process as set forth in claim 1, wherein, upon the completion of the treatment with sulphur dioxide solution, the vegetable substance is pressed to yield a concentrated solution of xylose of a high degree of purity.

References Cited in the file of this patent

UNITED STATES PATENTS

| | | |
|---|---|---|
| 2,302,022 | Giordani | Nov. 17, 1942 |
| 2,450,586 | Dunning | Oct. 5, 1948 |
| 2,516,833 | Ant-Wuorinen | Aug. 1, 1950 |
| 2,734,836 | Elian et al. | Feb. 14, 1956 |

FOREIGN PATENTS

| | | |
|---|---|---|
| 545,135 | Great Britain | May 12, 1942 |